Patented Nov. 6, 1928.

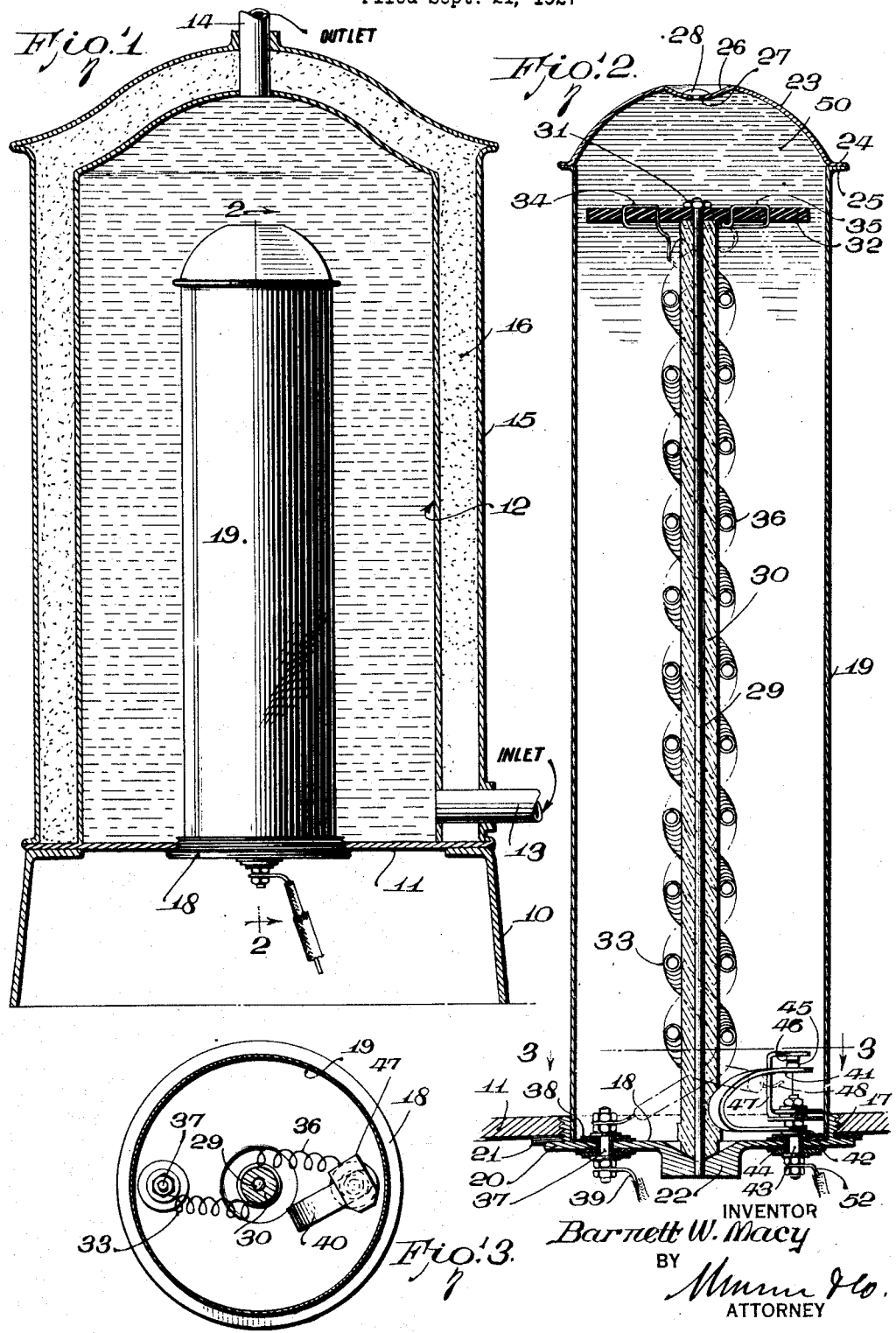

1,690,986

UNITED STATES PATENT OFFICE.

BARNETT WRIGHT MACY, OF JACKSONVILLE, FLORIDA, ASSIGNOR TO THE COMMERCIAL CLEARING CORPORATION, OF JACKSONVILLE, FLORIDA, A CORPORATION OF FLORIDA.

HEATING DEVICE.

Application filed September 21, 1927. Serial No. 221,112.

This invention relates to a heating device for liquids.

An object of the invention is the provision of an electric heater of simple construction which is adapted to be inserted within a storage tank for liquids and readily secured in place for maintaining the water at a predetermined temperature.

Another object of the invention is the provision of a heating unit adapted to be inserted in a storage tank for liquids for maintaining the liquids at a predetermined temperature and in which the electric resistance is located within an oil bath so that the heat is evenly distributed to the liquid in the storage tank in an economical manner.

A further object of the invention is the provision of a heating element formed of resistance material enclosed within a copper tubing which is hermetically sealed and filled with oil to provide for even distribution of the heat and in which a thermostat mounted in the oil bath is adapted to cut off the circuit through the resistance element when the temperature of the oil has reached a predetermined degree.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:—

Figure 1 is a vertical section of the storage tank showing my heating unit applied thereto, Figure 2 is a vertical section of the heating unit per se taken along the line 2—2 of Fig. 1, and Figure 3 is a horizontal section taken along the line 3—3 of Fig. 2.

Referring more particularly to the drawings 10 designates the base member upon which is mounted the bottom 11 of a storage tank 12. The storage tank has an inlet pipe 13 connected with the lower end and an outlet pipe 14 connected to the upper end through which the hot water is withdrawn. The storage tank may be of any configuration in cross section. The storage tank is embraced by a housing 15 and spaced therefrom, and an insulating material 16 is packed in the space to prevent the loss of heat from the liquid in the tank.

The bottom 11 of the tank is provided with a threaded passage into which is threaded an annular base member 18 of a cylinder 19 formed of copper. The lower end of the cylinder is secured to the base member 18 in any approved manner. This base member has a flange 20 adapted to clamp a washer 21 to the bottom 11 of the tank 12 in order to prevent leakage of the fluid from the tank. The base member 18 is provided with a centrally disposed boss 22.

The top of the cylinder 19 is closed by a cap 23 having flanges 24 secured to flanges 25 of the cylinder. The closure 23 is semispherical and has a depression 26 in which is provided an opening 27 through which the oil may be filled. When the cylinder is full the opening 27 is sealed as shown at 28 with any material suitable for the purpose.

A post 29 has its lower end secured in the boss 22 and disposed axially of the cylinder 19 and terminates at its upper end adjacent the upper end of the cylinder. An insulating sleeve 30 is mounted on the post and a nut 31 is threaded onto the upper end of the post and secures an insulating bar 32 to the upper end of the sleeve 30 and also aids in retaining the insulating sleeve, the post and the bar 32 in operative relation.

A resistance wire 33 which is spirally formed is trained around the sleeve 30 in a spiral manner and has its upper end, as shown at 34, inserted through perforations in the insulating bar 32 and connected to the upper end 35 of a resistance wire 36 which is of spiral formation and is trained around the sleeve 30 in spiral formation and in an opposite manner to the spiral 33. The lower end of the wire 33 is secured to a binding post 37 which projects through an insulating sleeve 38 and is connected at its outer end to a wire 39 of a source of current.

A thermostat generally designated by the numeral 40 consists of a strip 41 formed of two kinds of metal which are secured together in the usual manner and consists of two strips of metal having different co-efficients of expansion. The lower end of the strip 41 is secured at 42 to a binding post 43 which is insulated, as shown at 44, from the bottom 22 of the cylinder 19. The free end of the strip 41 is provided with a contact 45 adapted to normally engage a contact 46 on a metal bracket 47 which is mounted on the binding post 43 but insulated therefrom. The wire 36, as shown at 48, is secured to the bracket 47 so that when the strip 41 maintains the contact 45 in engagement with the contact 46 current will flow through the wires 33 and 36 and since this wire is of resistance material the same will be heated for heating the oil 50 in the cylinder 19. Said cylinder is formed of copper so that heat from the oil will readily pass to the liquid 51 in the storage tank 12.

The operation of my device is as follows:

The heating unit which is enclosed by the copper cylinder 19 may be inserted or screwed into an opening 17 of the bottom 11 of the storage tank 12 or the same may be screwed into a threaded opening in an enlarged portion of the pipe through which the water is adapted to circulate. For heating water or other liquids the electric current passes through the wire 52, through the thermostatic element 41, through the bracket 47 and the wires 36 and 33. Even if the oil reaches a predetermined degree the temperature effects the strip 41 and causes the same to move contact 45 away from contact 46 thereby breaking the circuit until the oil sufficiently cools, when the thermostatic strip again closes the circuit. The heating units which have been applied for heating the oil 50 in the cylinder 19 is transferred to the liquid 51 in the storage tank 12.

An important feature of the invention is that the thermostat is immersed in a bath of oil and thus prevents pitting and sticking of the points and thereby eliminates arcing so that the life of a thermostat is prolonged. The resistance elements 33 and 36 are made of the proper alloy in order to eliminate oxidation, concentration of the heat and carbonization of the oil, which is of a conduction and insulating type. The heating unit may not only be employed in storage tanks or in circulating types of water heaters but may also be employed for steam tables, coffee urns, glue pots, candy kettles, etc.

I claim:—

A device of the character described comprising a hermetically sealed cylinder filled with oil, a sleeve formed of insulating material mounted axially on the cylinder, an electric resistance wire in the form of a spiral coil and composed of two sections arranged on the sleeve, one section being spirally wound around the sleeve in one direction, a second section being wound spirally around the sleeve in an opposite direction to the winding of the first mentioned section, means for connecting the free ends of the sections with a source of current, a thermostat located in the path of oil, and means for interpolating the thermostat between the source of current and the free end of the coil.

BARNETT WRIGHT MACY.